United States Patent
Xu et al.

(10) Patent No.: US 8,701,143 B2
(45) Date of Patent: Apr. 15, 2014

(54) METHOD AND APPARATUS FOR SUPPORTING MOBILITY IN DVB-H CBMS SYSTEM

(75) Inventors: Yiling Xu, Suwon-si (KR); Jong-Hoon Ann, Suwon-si (KR); Jae-Yeon Song, Seoul (KR); Kook-Heui Lee, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 1060 days.

(21) Appl. No.: 11/711,460

(22) Filed: Feb. 27, 2007

(65) Prior Publication Data

US 2008/0039075 A1 Feb. 14, 2008

Related U.S. Application Data

(60) Provisional application No. 60/833,814, filed on Jul. 28, 2006.

(30) Foreign Application Priority Data

Feb. 27, 2006 (KR) .......................... 10-2006-0019002

(51) Int. Cl.
*H04N 7/16* (2011.01)

(52) U.S. Cl.
USPC ............. 725/62; 455/428; 455/436; 455/437; 455/440; 455/456.1; 455/67.11

(58) Field of Classification Search
USPC ............. 725/62, 81; 455/428, 436, 437, 440, 455/456.1, 67.11
See application file for complete search history.

(56) References Cited

U.S. PATENT DOCUMENTS 7,486,640 B2 * 2/2009 Borsos et al. ................. 370/331

| 2004/0120285 | A1 | 6/2004 | Paila et al. |
| 2004/0180661 | A1 | 9/2004 | Chen et al. |
| 2005/0233705 | A1 | 10/2005 | Vare et al. |
| 2006/0262793 | A1 * | 11/2006 | Vare et al. ..................... 370/390 |
| 2007/0050820 | A1 * | 3/2007 | Saarikivi et al. ................ 725/62 |

FOREIGN PATENT DOCUMENTS

WO WO 2004/086656 10/2004

OTHER PUBLICATIONS

Digital Video Broadcasting (DVB); DVB-H Implementation Guidelines, ETSI TR 102 377 V1.2.1, European Broadcasting Union, Nov. 1, 2005.
Digital Video Broadcasting (DVB); Guidelines on Implementation and Usage of Service Information (SI), ETSI TR 101 211 V1.7.1, European Broadcasting Union, Feb. 1, 2006.
Samsung Electronics, "Use Cases for Mobility and Roaming Specification", TM-CBMS 1516, DVB TM CBMS, IPDC in DVB-H, Jan. 24, 2006.
Samsung, "Mobility Use Case for Phase II Specification", TM-CBMS 1677, DVB TM CBMS, IPDS in DVB-H, Jun. 20, 2006.
Samsung, "Service_id Issue for Mobility", TM-CBMS, DVB TM CBMS, IPDC in DVB-H, Feb. 25, 2006.

* cited by examiner

*Primary Examiner* — Mulugeta A Mengesha
(74) *Attorney, Agent, or Firm* — The Farrell Law Firm, P.C.

(57) ABSTRACT

Disclosed is a DVB-H CBMS system by which a user can continue to view a program being in service even when the transport stream or IP platform changes while the user views the program. In the DVB-H CBMS system, the system transmits service mapping information according to transport streams or IP platforms to the terminal, so that the system can provide a service without interruption to the terminal even when a user of the terminal moves out of a current cell or network into a new cell or network while receiving a service that the user selected.

20 Claims, 13 Drawing Sheets

METHOD AND APPARATUS FOR SUPPORTING MOBILITY IN DVB-H CBMS SYSTEM

PRIORITY

This application claims the benefit of U.S. Provisional Application No. 60/833,814, filed Jul. 28, 2006, and under 35 U.S.C. §119(a) of an application entitled "Method And Apparatus For Supporting Mobility In DVB-H CBMS System" filed in the Korean Industrial Property Office on Feb. 27, 2006 and assigned Serial No. 2006-19002, the contents of which are hereby incorporated by reference.

BACKGROUND OF THE INVENTION

1. Field of the Invention

The present invention relates to a mobile Digital Video Broadcasting-Handheld (DVB-H) Convergence of Broadcasting and Mobile Service (CBMS) system, and more particularly to a method and an apparatus for providing handover-related information to a terminal trying to perform handover, by using Program Specific Information/Service Information (PSI/SI).

2. Description of the Related Art

The DVB-H CBMS is a service providing a more convenient function through combination of a mobile communication system and a digital TV broadcast service having an excellent mobile reception capability. As the digital televisions come into wide use in place of the analog televisions, viewers became capable of enjoying indoors a high quality screen of a High Definition Television (HDTV) class and high quality sound of a Compact Disc (CD) class. However, the variety of the modern society has changed the activity and life patterns of viewers and has generalized portable devices, such as mobile phones, Personal Digital Assistants (PDAs), notebook computers, etc. As a result, there has been rapid increase in demands for enjoyment of a television with a clear screen quality even while on the move. Further, there has been a trial to overcome the limitation of the broadcast networks having no uplink channel by connection to a mobile communication network. Such a trial has yielded the DVB-H CBMS.

The DVB-H CBMS system has been made for a reception terminal capable of using a mobile communication channel and includes the concept of handover supported by a cell-based wireless communication such as the conventional mobile communication system. However, the handover of the DVB-H CBMS is different from the handover of a mobile communication system. That is, in the handover of a mobile communication system, a network manages individual users and receives measurement reports for management of the network including the handover. However, in the case of a typical broadcast system, a broadcast provider provides services and content but does not manage all individual users. The information needed for the reception of the broadcasting is sent to all users through the broadcast network, and the broadcast system does not have a user management function. The handover of the broadcast network has a specific technological requirement, which differentiates it from the handover of the mobile communication system.

FIG. 1 is a block diagram illustrating a structure of a typical mobile digital video broadcast network system. The illustrated entities include logical entities that may be or may not be physically discriminated. These logical entities can be combined into one or more physical entities. Further, only the interfaces in relation to the core idea of the present invention are illustrated in FIG. 1.

The system illustrated in FIG. 1 is for the Digital Video Broadcasting-Convergence of Broadcasting and Mobile Service (DVB-CBMS), which is one standard for mobile broadcast terminals. Although the notification broadcasting structure of the DVB-CBMS is illustrated as an example in FIG. 1 for convenience of description, other mobile broadcast systems having a notification message function operate in similar ways.

Referring to FIG. 1, the Content Creation (CC) unit 110 is a provider of broadcast services, which include conventional voice/image broadcast services, file (music file or data file) download services, etc. When there is a problem or change in the supply of the broadcast services, the content creation unit 110 notifies a notification event creator within a broadcasting Service Application (SA) unit 120 of the change.

The service application unit 120 receives content data of the broadcast service from the content creation unit 110, generates broadcast service data by processing the content data into a type proper for the broadcast network (for example, streaming audio/video or movie download, etc.), generates standardized metadata necessary for Electronic Service Guide (ESG), and generates charge information according to users. Further, the service application unit 120 receives the notification of a change in the broadcast service from the content creation unit 110, transmits a notification event to the notification message creator disposed within a service management unit 115, and provides service guide property information used in generating the notification message to the notification message generator.

The service management unit 115 determines a schedule for transmission of the broadcast service supplied from the service application unit 120 and generates a service guide. The service management unit 115 is connected to a broadcast network 140 for providing the broadcast service and an interactive network 150 for supporting interactive communication.

The service management unit 115 manages service provision information (such as subscriber information for receiving the broadcast service and information about if a subscriber has purchased related contents) and device information about terminals receiving the broadcast service. Further, the service management unit 115 transmits user charge information to the service application unit 120 and provides the subscriber information, the service provision information, and device information to the broadcast network 140 and the interactive network 150.

The broadcast network 140 is a network for transmitting a broadcast service, as an example of which the DVB-H is described herein.

The interactive network 150 transmits a broadcast service on a one to one basis or interactively exchanges control information and additional information in relation to the reception of the broadcast service. For example, the interactive network 150 may be a conventional cellular network such as the 3GPP Wideband Code Division Multiple Access (WCDMA).

The terminal 160 can receive a broadcast service and may be connected with a cellular network according to its capability. As used herein, the present invention considers a terminal that can be connected with a cellular network.

The interfaces between blocks of the mobile broadcast system will now be described.

CBMS-x refers to an interface for transmission within a range of an IP datacast standard through the DVB-H, and X-x refers an interface for transmission out of the range of the IP datacast standard through the DVB-H. Specifically, CBMS-7 interface is an interface for transmission from the service application unit 120 to the service management unit 115, and CBMS-3 interface is an interface used when a message is transmitted from the service management unit 115 through the broadcast network 140 and a broadcasting channel to the terminal 160. CBMS-4 interface is an interface when the message transmitted from the service management unit 115 is provided to the terminal 160 through either a dedicated channel for the terminal 160 or a broadcasting channel provided by the interactive network 150. CBMS-6 interface is an interface between the service management unit 115 and the broadcast network 140, which is used in order to receive event information occurring in the broadcast network 140 or set a transmission path to be used in the broadcast network 140 by the service management unit 115. CBMS-1 interface is an interface for carrying a control signal of the broadcast network, which is transferred to the terminal. In the DVB-H, a control signal channel called Program Specific Information/Service Information (PSI/SI) corresponds to CBMS-1. The X-3 interface is an interface used for setting of a transmission channel between the service management unit 115 and the interactive network 150, the X-2 interface is an interface for setting of a transmission channel between the terminal 160 and the interactive network 150, and the X-1 interface is an interface for setting of a transmission channel between the content creation unit 110 and the service application unit 120.

When a user belonging to the DVB-H network has moved from the reference network to a neighbor network or to another IP platform, the new network or IP platform also must provide the service being viewed without interruption. The terminal must find the program, which the user was viewing before the handover, in the new network to which the terminal has moved, and must continue to receive the program. When the transport stream changes, the terminal must find out a transport stream providing the same service in the new network or IP platform to which the terminal has moved. When the transmission frequency changes, it is necessary to know frequency information of the neighbor network or IP platform. The information in order to perform the above process can be obtained from the PSI/SI provided by the DVB broadcast network. The handover process and method in this case will not be described in detail herein, and a detailed description thereof is found in "ETSI TR 101 211 Digital Video Broadcasting(DVB); Guidelines on implementation and usage of Service information (SI)."

FIGS. 2A and 2B are block diagrams illustrating a transmitter and a receiver for conventional mobile digital video broadcasting, respectively.

In the transmitter shown in FIG. 2A, a data IP stream 200 and an ESG IP stream 201, which are information to be transmitted, are input to a DVB IP encapsulator 212, and MPEG-related information 202 and service information 203 are input to a PSI/SI table generator 213. The DVB IP encapsulator 212 encapsulates the received data IP stream 200 and ESG IP stream 201 and then outputs the encapsulated data to a multiplexer 220. The PSI/SI table generator 213 generates a PSI/SI table based on the input MPEG-related information 202 and service information 203 and the information received from the DVB IP encapsulator 212 about whether the ESG has been updated, and then outputs the generated PSI/SI table to the multiplexer 220. The multiplexer 220 multiplexes the encapsulated IP stream input from the DVB IP encapsulator 212, the PSI/SI table input from the PSI/SI table generator 213, and the MPEG TV streams 210 and 211, and then outputs the multiplexed data to a DVB modulator 230. The DVB modulator 230 modulates the data from the multiplexer 220 and then transmits the modulated data through an antenna 240.

In the receiver shown in FIG. 2B, the signal received through an antenna 250 is demodulated by a DVB demodulator 251, and the demodulated signal is input to a demultiplexer 260. The demultiplexer 260 de-multiplexes the input signal and then outputs the de-multiplexed signals to a DVB IP decapsulator 270, an MPEG decoder 271, and a PSI/SI processor 272. The DVB IP decapsulator 270 restores the IP stream by de-capsulating the encapsulated IP data and then outputs the restored IP stream to an ESG processor 280 and a data processor 281. The ESG processor 280 and the data processor 281 output necessary information for the user to a user interface 290 by using the input IP stream. The MPEG TV streams 210 and 211 are decoded by the MPEG decoder 271 and are then output to the user interface 290. Finally, from among the PSI/SI information input to the PSI/SI processor 272, the information necessary for the MPEG decoding is provided to the MPEG decoder 271 while other information is output to an adjustment unit 282. The adjustment unit 282 determines if handover is necessary, by referring to the PSI/SI information and by collecting the handover-related information distributed in each table. If handover is necessary, the adjustment unit 282 informs a broadcast reception controller 252 of the handover-related information. The broadcast reception controller 252 controls the DVB demodulator 251 in order to receive the broadcasting signal. That is, when the handover is performed, the broadcast reception controller 252 performs operations for controlling the DVB demodulator 251. For example, the broadcast reception controller 252 measures the reception intensity of a received broadcasting signal from a neighbor cell and may change the reception frequency of the receiver according to the changed frequency. Further, the broadcast reception controller 252 outputs necessary information to the user interface 290 by using the received service information.

FIG. 3 is a flow diagram illustrating a conventional handover process of a receiver.

Referring to FIG. 3, when the terminal has started to operate in step 300, the terminal receives a broadcasting signal in step 310. Then, in step 320, the terminal displays a service selected by a user on a screen after restoring a signal of the service through demodulation and decoding of the signal. After completing step 320, the terminal performs steps 330 and 340. Although steps 330 and 340 are sequentially presented in the specification and the drawing for convenience of description, it goes without saying that they can be simultaneously performed with step 320 in which the service is restored.

Steps 330 and 340 correspond to steps in which the adjustment unit 282 of FIG. 2B collects information necessary for the handover from among the information received from the PSI/SI processor 272. From among the information included in the PSI/SI, the handover-related information is mainly distributed in the Network Information Table (NIT) and the Service Description Table (SDT). Therefore, the receiver can collect the handover-related information in steps 330 and 340.

Thereafter, the receiver performs step 350 in order to determine if it is necessary to perform the handover. If it is determined in step 350 that the handover is unnecessary, the receiver returns to step 310 in which the receiver receives a broadcasting signal. If it is determined in step 350 that the handover is necessary, the receiver measures the reception intensity of neighbor cells and selects an optimum signal in step 360. Then, in step 370,-the receiver adjusts the frequency. Step 370 corresponds to a step for adjustment including the frequency adjustment, in order to receive a broadcasting signal from a new cell. Thereafter, in step 380, the receiver determines if reception of the new broadcasting signal is a success. When the reception of the new broadcasting signal is a success, the receiver returns to step 310 and performs the process again from step 310. When the reception of the new broadcasting signal is a failure, the receiver proceeds to step 390 in which the receiver terminates the process.

According to the conventional handover process as described above, even when a mobile digital video broadcasting receiver changes its position, a user of the mobile digital video broadcasting receiver can use a service selected by the user without interruption by handover. However, in the case of the conventional handover process, because the information for the handover is distributed in each table of the PSI/SI, the receiver must collect the information for the handover by referring to each table. Moreover, the conventional handover uses service IDs in order to identify the selected services during the handover. Generally, different networks allocate different service IDs to the same service.

SUMMARY OF THE INVENTION

Accordingly, the present invention has been made to solve the above-mentioned problems occurring in the prior art, and the present invention provides a method and an apparatus for providing inter-transport stream information or inter-IP platform information to a terminal in a mobile Digital Video Broadcasting-Handheld (DVB-H) Convergence of Broadcasting and Mobile Service (CBMS) system.

In accordance with an aspect of the present invention, there is provided a method for supporting the mobility of a terminal by a network in a mobile Digital Video Broadcasting-Handheld (DVB-H) Convergence of Broadcasting and Mobile Service (CBMS) system, the method includes setting mapping information for broadcast services according to different transport streams corresponding to a current broadcast service that is currently received by the terminal; and transmitting to the terminal the mapping information for the set broadcast service.

In accordance with another aspect of the present invention, there is provided a method for supporting mobility of a terminal by a network in a mobile DVB-H CBMS system, the method includes setting mapping information for broadcast services according to different IP platforms corresponding to a current broadcast service that is currently received by the terminal; and transmitting the mapping information for the set broadcast service to the terminal.

In accordance with another aspect of the present invention, there is provided a method for receiving a broadcast service by a terminal in a mobile DVB-H CBMS system, the method includes, when handover or roaming is necessary while the terminal is receiving the broadcast service, receiving service mapping information about a service transmitted in another transmission stream, which corresponds to the broadcast service; when the mapping information includes candidate services corresponding to the broadcast service, testing the candidate services and selecting one service from the candidate services; and performing roaming in order to receive the selected service.

In accordance with another aspect of the present invention, there is provided a method for receiving a broadcast service by a terminal in a mobile DVB-H CBMS system, the method includes, when roaming is necessary while the terminal is receiving the broadcast service, receiving service mapping information about a service transmitted in another transmission stream, which corresponds to the broadcast service; when the mapping information includes candidate services corresponding to the broadcast service, testing the candidate services and selecting one service from the candidate services; and performing roaming in order to receive the selected service.

In accordance with another aspect of the present invention, there is provided a network apparatus for supporting mobility of a terminal by a network in a mobile DVB-H CBMS system, the network apparatus includes: a service application unit for collecting content from sources and related metadata in order to provide applications for a specific service; an Electronic Service Guide (ESG) provider for generating ESG for a broadcast service from the metadata collected by the service application unit; and a mobility manager for managing movement of the terminal to another network, wherein service mapping information about a broadcast service provided by another IP platform or another transport stream corresponding to the current broadcast service being currently received by the terminal is transmitted to the terminal through Program Specific Information/Service Information (PSI/SI).

In accordance with another aspect of the present invention, there is provided a terminal for receiving a broadcast service from a network in a mobile DVB-H CBMS system, the terminal includes a broadcast receiver for receiving a broadcast service or signal from a broadcast network; an interactive adaptor for receiving an interactive service or signal from an interactive network; and a mobility manager for managing movement to another network, wherein the terminals receives PSI/SI for the broadcast service through the broadcast receiver, is included in the PSI/SI, and receives service mapping information for a broadcast serving provided by another IP platform or another transport stream corresponding to the broadcast service being currently received by the terminal included in the PSI/SI.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EXEMPLARY EMBODIMENT

Hereinafter, exemplary embodiments of the present invention will be described with reference to the accompanying drawings. In the following description, a detailed description of known functions and configurations incorporated herein will be omitted when it may make the subject matter of the present invention rather unclear. Further, various specific definitions found in the following description are provided only to help general understanding of the present invention, and it is apparent to those skilled in the art that the present invention can be implemented without such definitions.

In the current CBMS system, concepts of the handover and roaming have not been clearly defined. However, the handover concepts are based on a change in the IP platform, the ESG provider, and the network manager. Handover is defined as change of reception within one IP platform, which may change according to the final definition.

Figure 1:
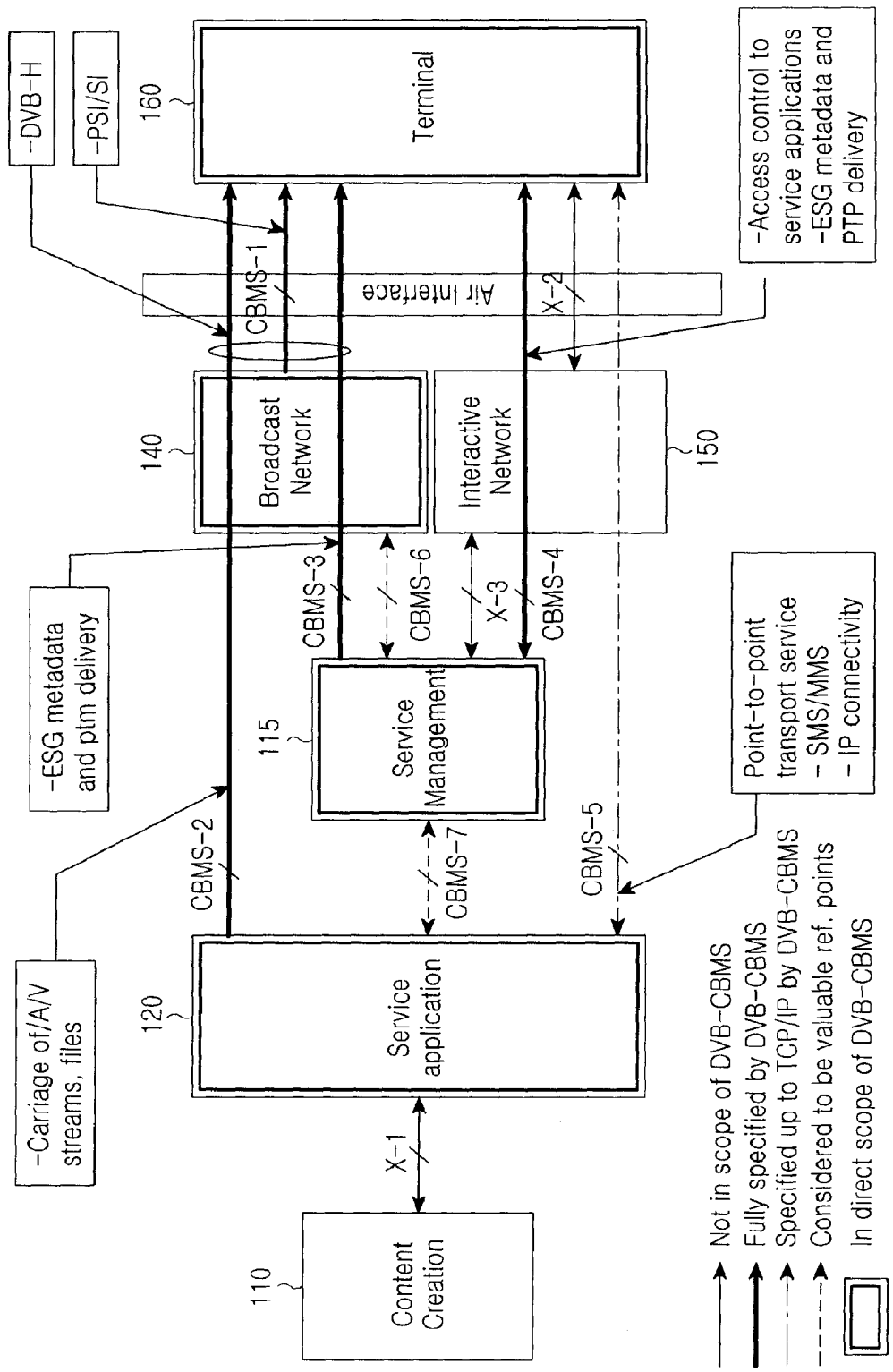
FIG. 1 is a block diagram illustrating a structure of a typical mobile digital video broadcast network system.
Figure 2A:
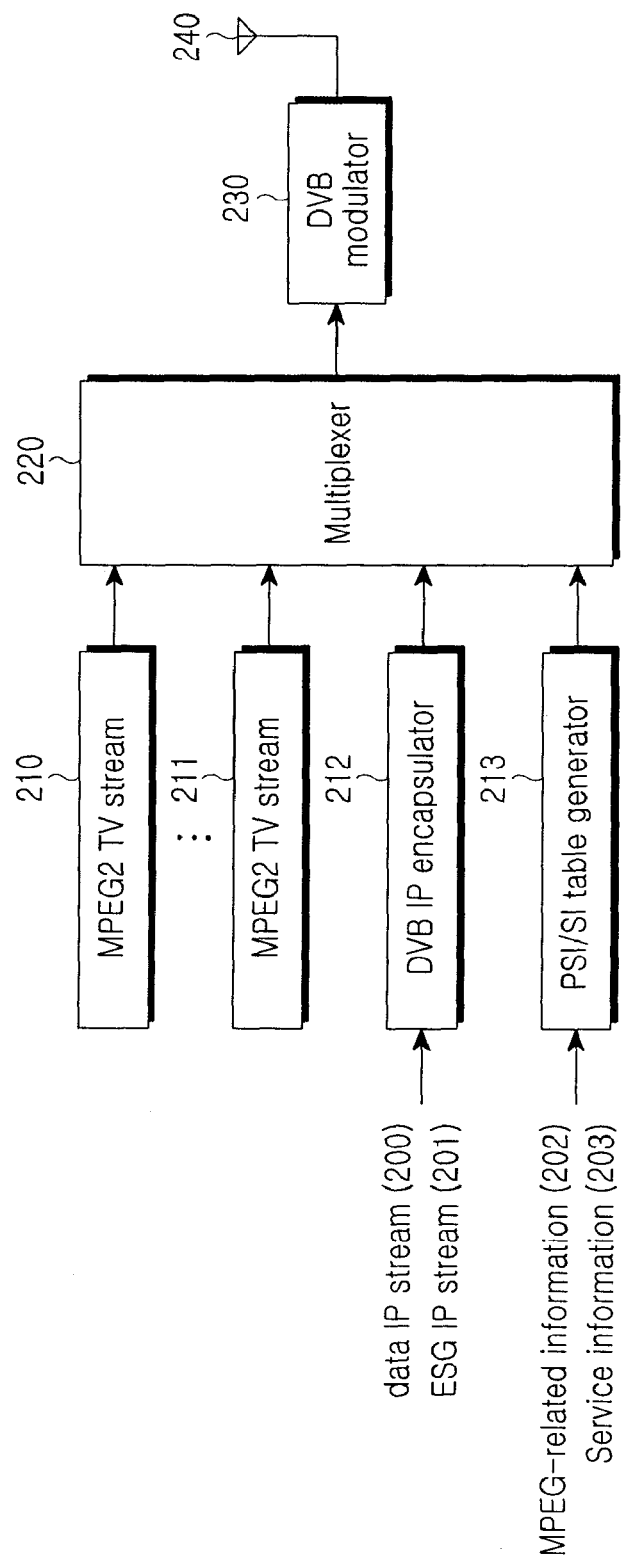
FIG. 2A is a block diagram illustrating a transmitter of a conventional mobile digital video broadcasting system.
Figure 2B:
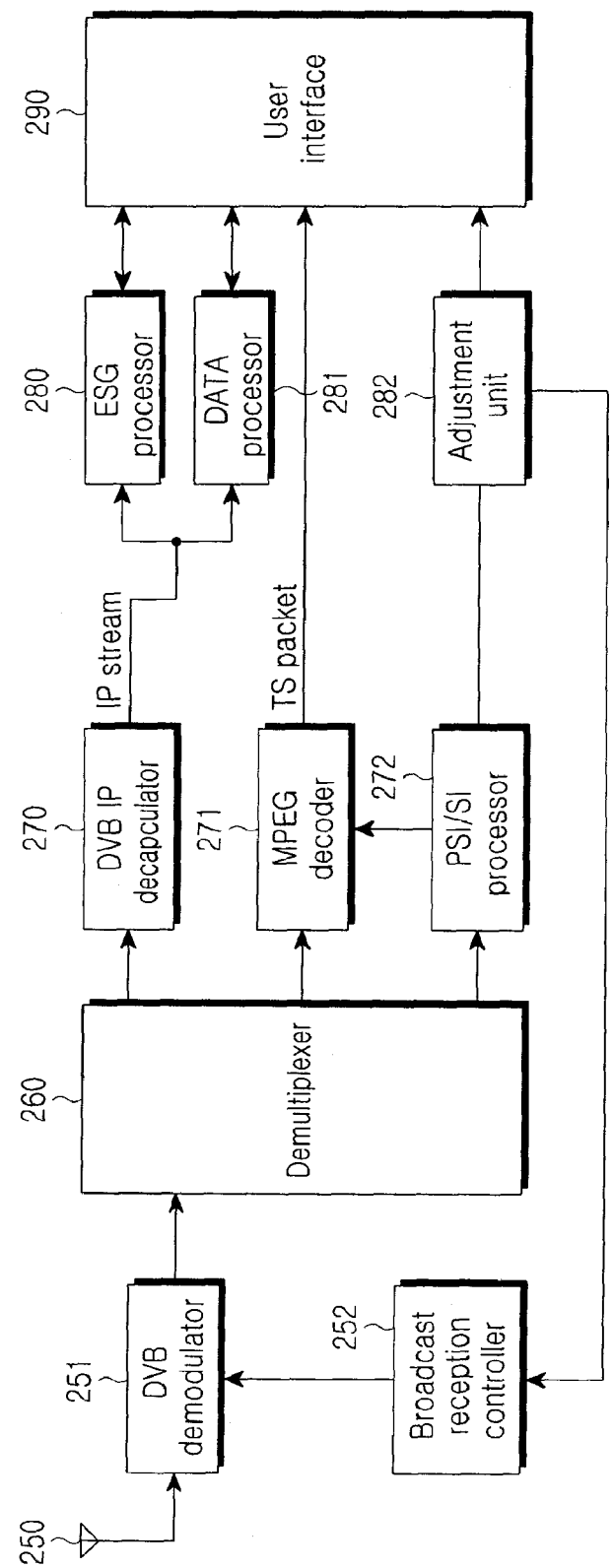
FIG. 2B is a block diagram illustrating a receiver of a conventional mobile digital video broadcasting system.
Figure 3:
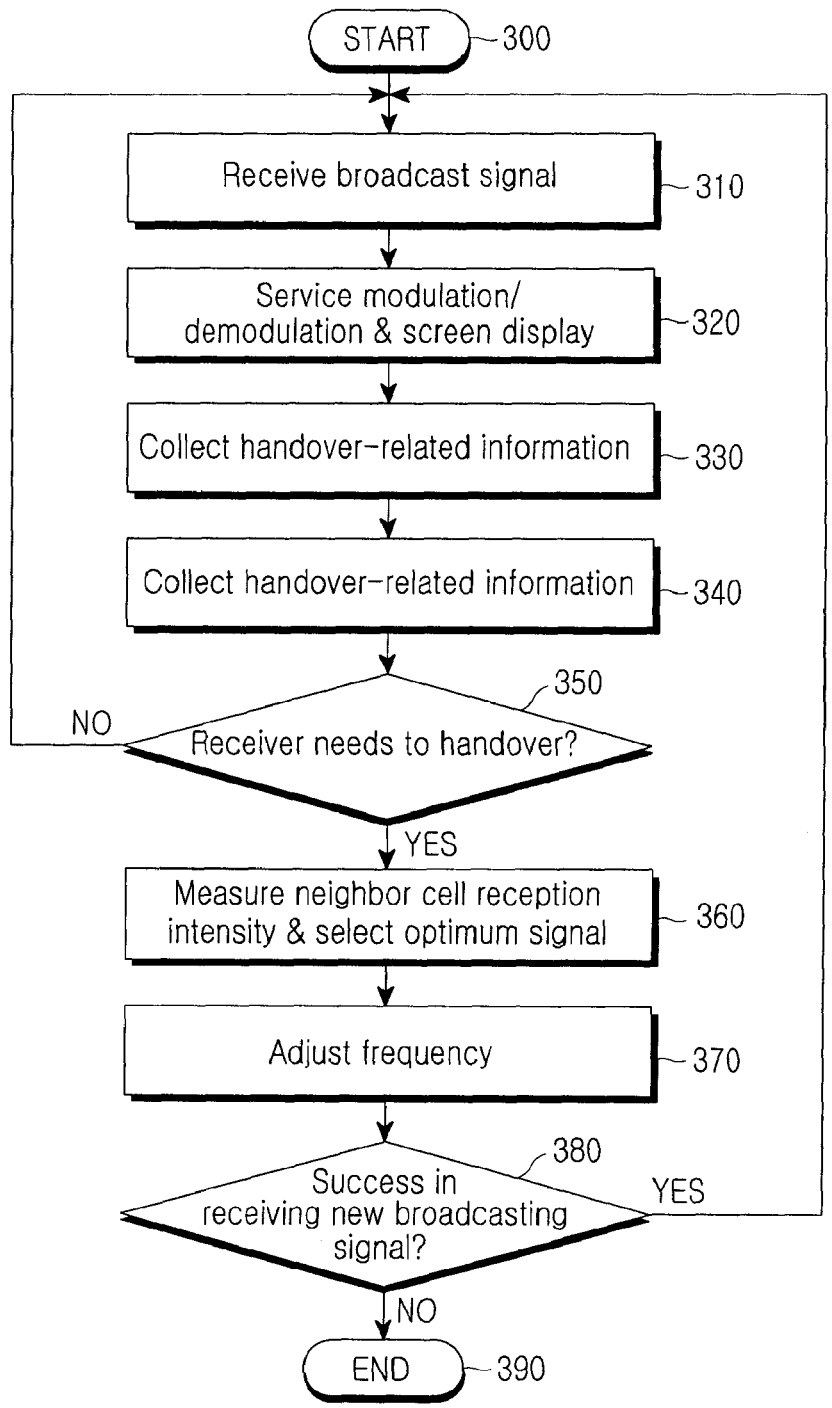
FIG. 3 is a flow diagram illustrating a conventional handover process of a receiver.
Figure 4:
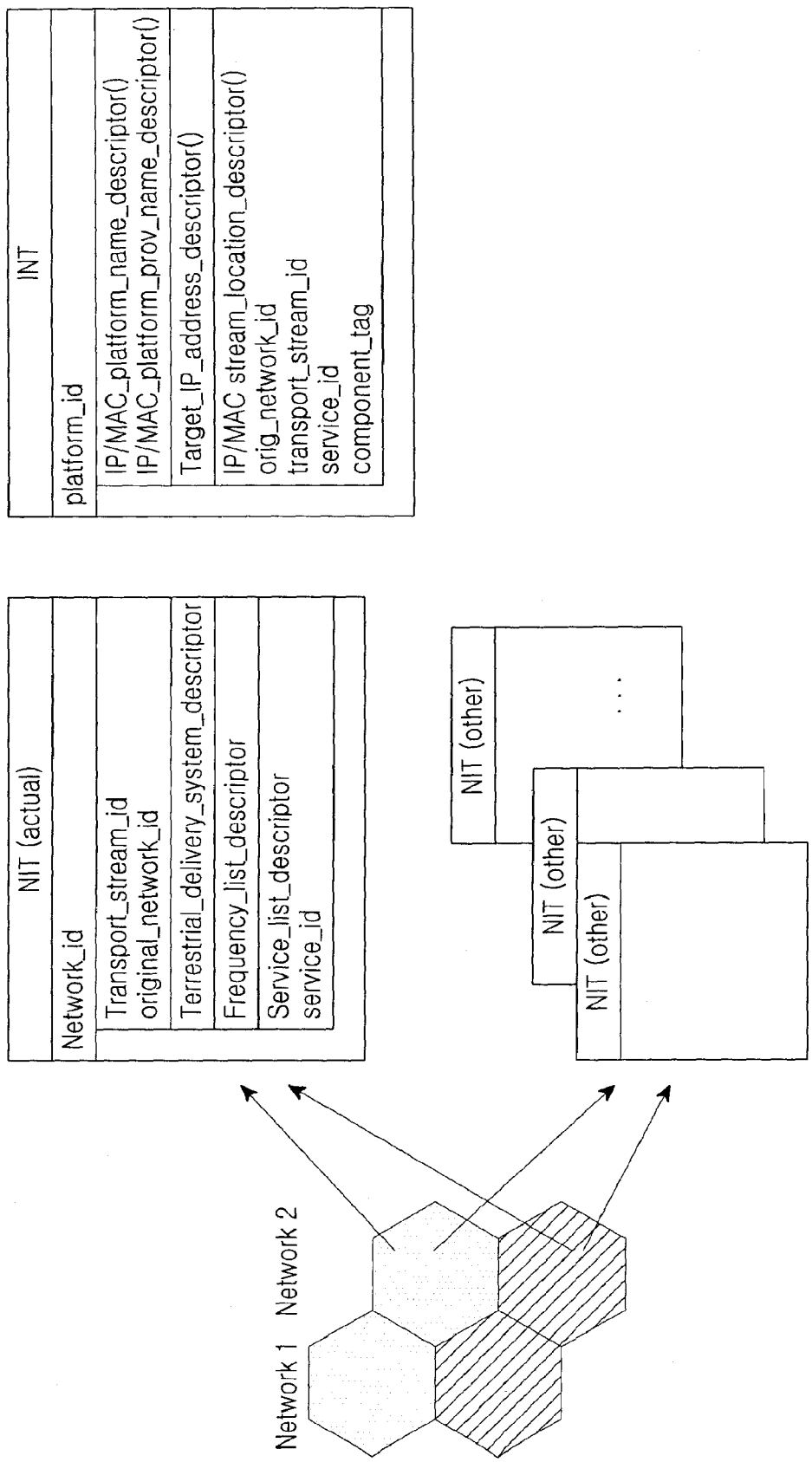
FIG. 4 illustrates a concept of handover in a typical mobile digital video broadcast system.

FIG. 4 illustrates a concept of handover in a typical mobile digital video broadcast system.

Referring to FIG. 4, when a network includes a plurality of cells, a central frequency used in one cell for each transport stream is provided by the terrestrial_delivery_system_descriptor, and the other frequencies are provided by the frequency_list_descriptor. If the terminal knows all possible central frequencies, the terminal only needs to test the known frequencies for sufficient signal intensities, decode corresponding transport streams, and identify only the same pair of original_network_id and transport_stream_id.

When the terminal crosses a network boundary, the probed frequencies are not transmitted with the same transport stream. Network Information Tables (NITs) for neighbor networks are transmitted, and lost transport streams are also transmitted from neighbor networks. Then, the terminal can determine the lost transport streams by testing the frequencies provided to the other NITs. However, it is necessary to clarify the service identifier when a change occurs in the service reception.

The first case is when the service reception changes to another IP platform of another cell having a different transport stream. If one service is provided with two transport streams having two different service IDs, the terminal cannot locate the service based on the NIT. Because the two transport streams belong to different platforms, the terminal cannot locate the selected service even when the selected service exists in another transport stream.

The second case is when the service reception changes to another IP platform of another cell having a different transport stream within another network. If one service is provided from two networks having two different service IDs, the terminal cannot locate the service based on the IP/MAC Notification Table (INT), because two transport streams belong to different platforms. Therefore, the terminal cannot locate the selected service even when the selected service exists in another transport stream.

The third case is when the IP platform changes within the same signal. At this time, the terminal wants to change into another IP platform for the same service. That is, the same service is provided to two different IP platforms within one transport stream. One transport stream is required to have a unique service ID. Therefore, two platforms must have different service IDs even when both of them have the same service. This implies that the terminal cannot locate the same service by using the service ID. Further, the same service is required to be provided to two different IP platforms. Therefore, for the same service, different IP addresses may be used and different IP platform IDs may be used. This implies that the terminal cannot use the INT in order to find the same service for the handover.

Figure 5:
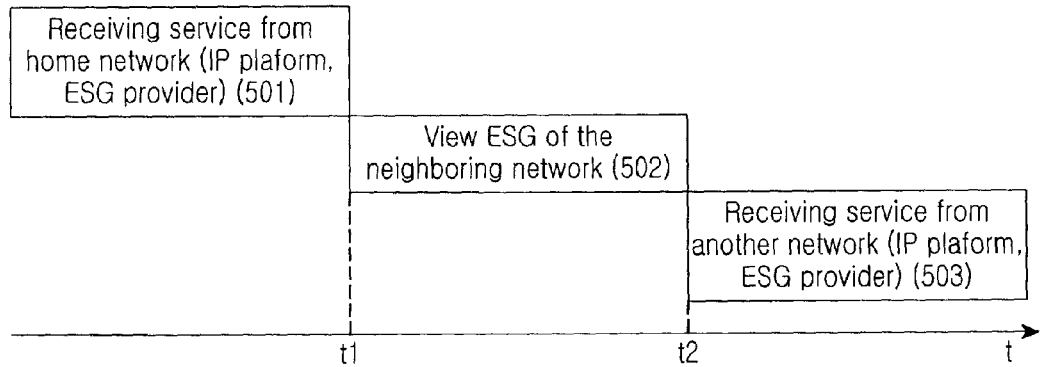
FIG. 5 illustrates a typical roaming process.

FIG. 5 illustrates a typical roaming process. Handover having continuity refers to continuous reception of a current service in spite of change of the reception signal within one IP platform. When a terminal cannot continue to receive a service within one IP platform, the terminal switches into another IP platform, in order to continuously receive a desired service. However, according to the typical roaming process, the terminal must stop receiving the current service, in order to receive ESG of a neighbor network and determine if there exists a desired service. When there exists a desired service, the terminal can move to the neighbor network in order to receive the service. That is, as shown in FIG. 5, the terminal stops receiving the current service provided through a home network (including IP platform and ESG provider) in step 501, and receives ESG of the neighbor network in step 502. Then in step 503, when a desired service has been found in the neighbor network, the terminal moves to the neighbor network and receives the found service. However, because the terminal cannot receive the service during the interval between t1 and t2, it is impossible to provide continuity of the service.

Figure 6:
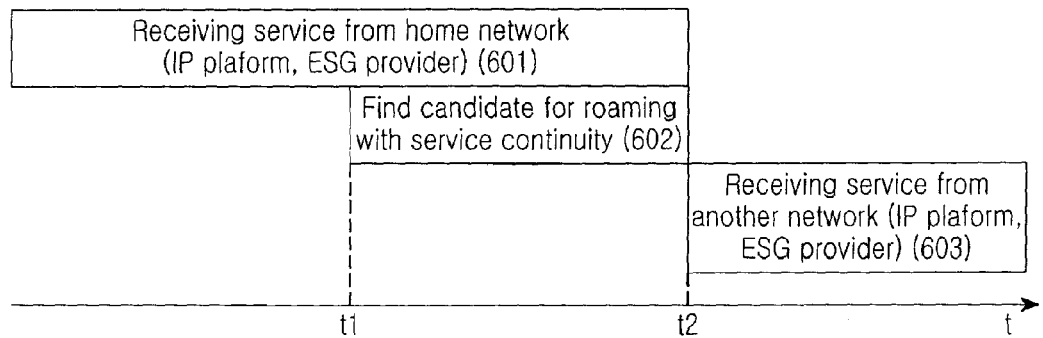
FIG. 6 illustrates a roaming process proposed by the present invention.

FIG. 6 illustrates a roaming process proposed by the present invention.

In FIG. 6, a terminal continues to receive a service provided through a home network (including IP platform and ESG provider) in step 601, and searches for a candidate network (including IP platform and ESG provider) in step 602. When a candidate network (including IP platform and ESG provider) is found, the terminal can continue in step 603 to receive the same service by using the found candidate network. That is, continuity of service is guaranteed.

In order to guarantee the continuity of service, the network provides service mapping information between transport streams or service mapping information between IP platforms to the terminal. The service mapping information between transport streams provided by the same IP platform is to support handover, and the service mapping information between transport streams provided by different IP platforms is to support roaming.

Hereinafter, specific embodiments of a method for providing service mapping information will be described.

1$^{st}$ Embodiment

Figure 7:
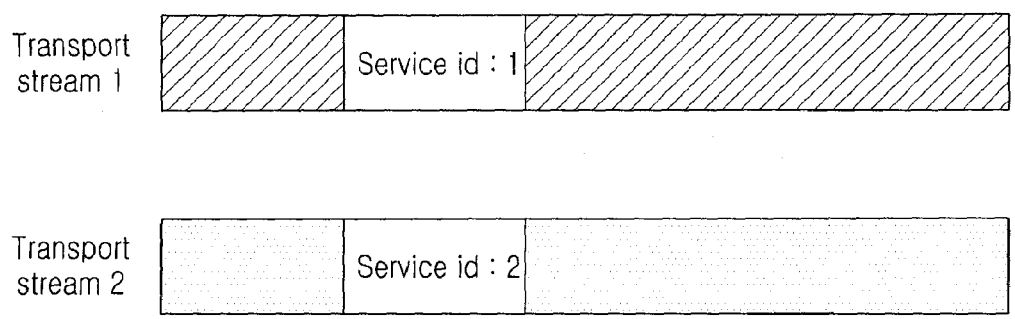
FIG. 7 illustrates two transport streams providing the same service.

FIG. 7 illustrates two transport streams providing the same service.

As shown in FIG. 7, even though the same service is provided by two different transport streams, the transport streams providing the same service have different service IDs. Therefore, according to the first embodiment of the present invention, service mapping information indicating an ID for the same service is provided to the terminal, so that the terminal can find a desired service even in another transport stream.

Table 1 is a mapping table indicating service mapping information between different transport streams.

TABLE 1

|  | Transport stream A | Transport stream B | Type |
|---|---|---|---|
| service | Service_id | Service_id | 1. identical |
|  | Transport stream_id | Transport stream_id | 2. Variation |
|  | Original network_id | Original network_id | 3. associated |

In Table 1, "Type" is used in order to describe services in different transport streams, "identical" refers to information for identifying the service, "variation" refers to variation information about the same service, and "associated" refers to information indicating an associated service. By using this information, it is possible to pass a transport stream including an undesired service and to find a transport stream providing a desired service through another service ID.

The information of Table 1 may be transmitted after being included in "service availability descriptor," which is one of PSI/SI elements and follows the TR 101 211 Digital Video Broadcasting(DVB); Guidelines on implementation and usage of Service information(SI), which defines PSI/SI information of the mobile digital video broadcasting. Otherwise, a new descriptor (Related_service_in_other_transport_stream_descriptor) for paging a service in relation to another transport stream descriptor may be inserted.

A structure of the Related_service_in_other_transport_stream_descriptor is shown in Table 2.

TABLE 2

| Syntax | Number of bits | identifier |
|---|---|---|
| Related_service_in_other_transport stream_descriptor( ){ | 8 | Uimsbf |
| Descriptor_tag | 8 | Uimsbf |
| Descriptor_length | 1 | Bslbf |
| Related_service_in_other_transport stream_flag | 7 | Bslbf |
| Reserved_future_use | 16 | Uimsbf |
| Service_id | 16 | Uimsbf |
| Transport stream_id Original network_id | 16 | Uimsbf |
| For (i=0;i<N; i++) { | 16 | Uimsbf |
| Service_id | 16 | Uimsbf |
| Transport stream_id | 16 | Uimsbf |
| Original network_id type | 8 | bslbf |
| } | | |
| } | | |

The Related_service_in_other_transport stream_flag of the new descriptor indicates if a service corresponding to the current service exists in another transport stream, and Service_id, Transport stream_id, and Original network_id are identification information items for the current service in an actual transport stream. If a mapped service exists, the identification information items are arranged one by one in the descriptor. The "Type" indicates tributes (identical, variation, and associated) of the mapping service provided by another transport stream.

In addition to the information as described above, information related to the frequency and cell network may be provided through "Related_service_in_other_transport stream_descriptor" as shown in Table 3 below, in order to help the terminal to find a desired service.

TABLE 3

| Syntax | Number of bits | identifier |
|---|---|---|
| Related_service_in_other_transport stream_descriptor( ){ | 8 | Uimsbf |
| Descriptor_tag | 8 | Uimsbf |
| Descriptor_length | 1 | Bslbf |
| Related_service_in other_transport stream_flag | 7 | Bslbf |
| Reserved_future_use | 16 | Uimsbf |
| Service_id | 16 | Uimsbf |

TABLE 3-continued

| Syntax | Number of bits | identifier |
|---|---|---|
| Transport stream id Original network_id | 16 | Uimsbf |
| For (i=0;i<N; i++) { | 16 | Uimsbf |
| Service_id | 16 | Uimsbf |
| Transport stream id | 16 | Uimsbf |
| Original network_id | 16 | Uimsbf |
| Network_id | 16 | Uimsbf |
| Cell_id | 16 | Uimsbf |
| Frequency list type | 8 | bslbf |
| } | | |
| } | | |

Figure 8:
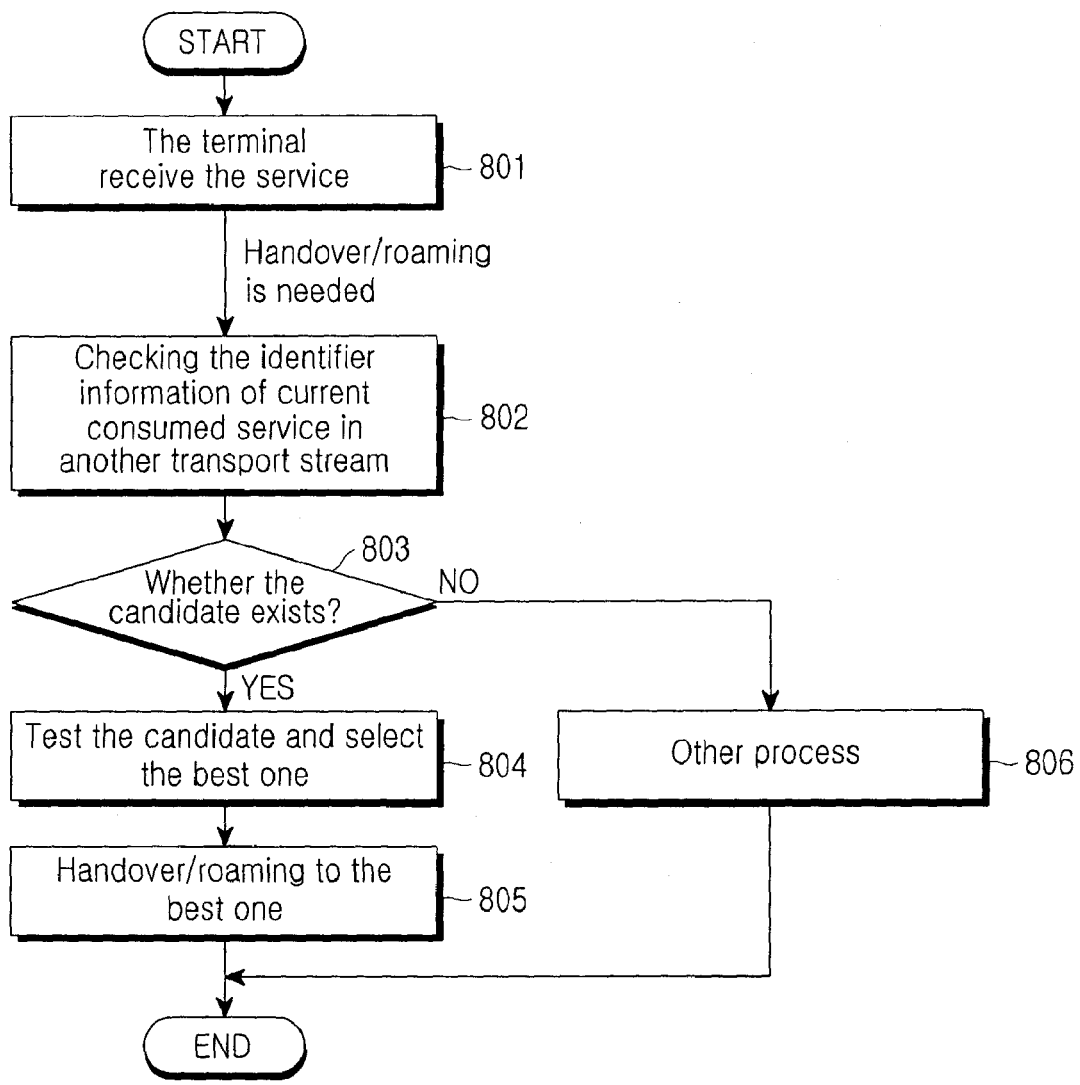
FIG. 8 is a flow diagram illustrating an operation of the terminal according to the present invention.

FIG. 8 is a flow diagram illustrating an operation of the terminal according to the first embodiment of the present invention.

Referring to FIG. 8, the terminal receives a service in step 801. Then, in step 802, when handover or roaming is necessary, the terminal checks ID information of a service, which corresponds to a currently received service and is transmitted in another transport stream.

Then, in step 803, it is determined if a candidate service exists. When candidate services exist, the terminal proceeds to step 804 in which the terminal tests the candidate services and select one service from among the candidate services. In step 805, the terminal performs handover or roaming in order to receive the selected service.

As a result of the determination in step 803, when no candidate service exists, the terminal proceeds to step 806 in which the terminal performs another process.

Figure 9:
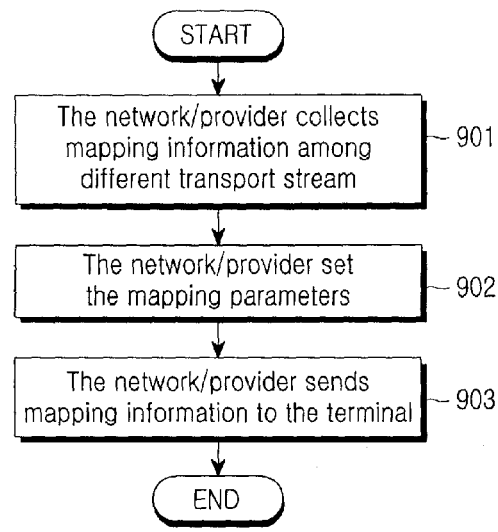
FIG. 9 is a flow diagram illustrating an operation of a network according to the present invention.

FIG. 9 is a flow diagram illustrating an operation of a network according to the first embodiment of the present invention.

Referring to FIG. 9, the network selects service mapping information about different transport streams in step 901, sets a mapping parameter about the selected mapping information in step 902, and transmits the mapping information including the set mapping parameter to the terminal in step 903.

$2^{nd}$ Embodiment

Figure 10:
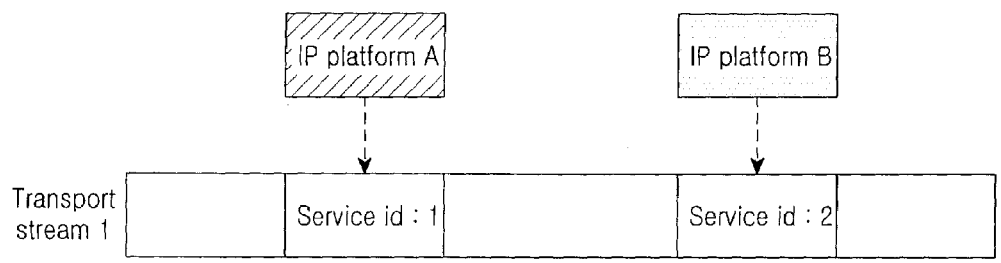
FIG. 10 illustrates a case in which the same service is provided in two different IP platforms belonging to the same transport stream.

FIG. 10 illustrates a case in which the same service is provided in two different IP platforms belonging to the same transport stream.

As shown in FIG. 10, when the same service is provided in two different IP platforms belonging to the same transport stream, the same service may have different service IDs according to the IP platforms. Therefore, in this case, the network needs to inform the receiver of the connection between the same services. When the terminal moves to another IP platform, the terminal can use the information in order to find and continuously receive the service that the terminal previously received. The information which the network notifies to the terminal in this case is shown Table 4 below.

TABLE 4

| IP platform_id (actual) | Neighboring IP platoform_id | Type |
|---|---|---|
| Service_id | New service_id | 1. identical |
| | | 2. variation |
| | | 3. associated |

Table 5 below shows a structure of a descriptor for sending the above-mentioned service and the IP platform mapping information.

TABLE 5

| Syntax | Number of bits | identifier |
|---|---|---|
| Service & IP platform | 8 | Uimsbf |
| _descriptor( ){ | 8 | Uimsbf |
| Descriptor_tag | 16 | Uimsbf |
| Descriptor_length | 16 | Uimsbf |
| Service_id | 16 | Uimsbf |
| Transport stream_id | 16 | Uimsbf |
| Original network_id | | |
| Platform_id | 16 | Uimsbf |
| For (i=0;i<N; i++) { | 16 | Uimsbf |
| service_id | 16 | Uimsbf |
| Platform_id | 16 | Uimsbf |
| Transport stream_id | 8 | bslbf |
| Original network id | | |
| type | | |
| } | | |
| } | | |
| } | | |

In this case also, information related to the frequency and cell network may be provided through "Service & IP_platform descriptor" as shown in Table 6 below, in addition to the information described above.

TABLE 6

| Syntax | Number of bits | identifier |
|---|---|---|
| Service & IP platform | | |
| _descriptor( ){ | 8 | |
| Descriptor_tag | 8 | Uimsbf |
| Descriptor_length | 16 | Uimsbf |
| Service_id | 16 | Uimsbf |
| Transport stream_id | 16 | Uimsbf |
| Original network_id | 16 | Uimsbf |
| Platform_id | | Uimsbf |
| For (i=0;i<N; i++) { | 16 | |
| service_id | 16 | Uimsbf |
| Platform_id | 16 | Uimsbf |
| Transport stream_id | 16 | Uimsbf |
| Original network id | 16 | Uimsbf |
| Network_id | 16 | Uimsbf |
| Cell_id | 16 | Uimsbf |
| Frequency | 8 | Uimsbf |
| type | | bslbf |
| } | | |
| } | | |
| } | | |

Tables 5 and 6 report the Service_id, Transport stream_id, Original network_id, which match with the service ID, so that the terminal can recognize which IP platform has the same service and which TS has the same service.

Figure 11:
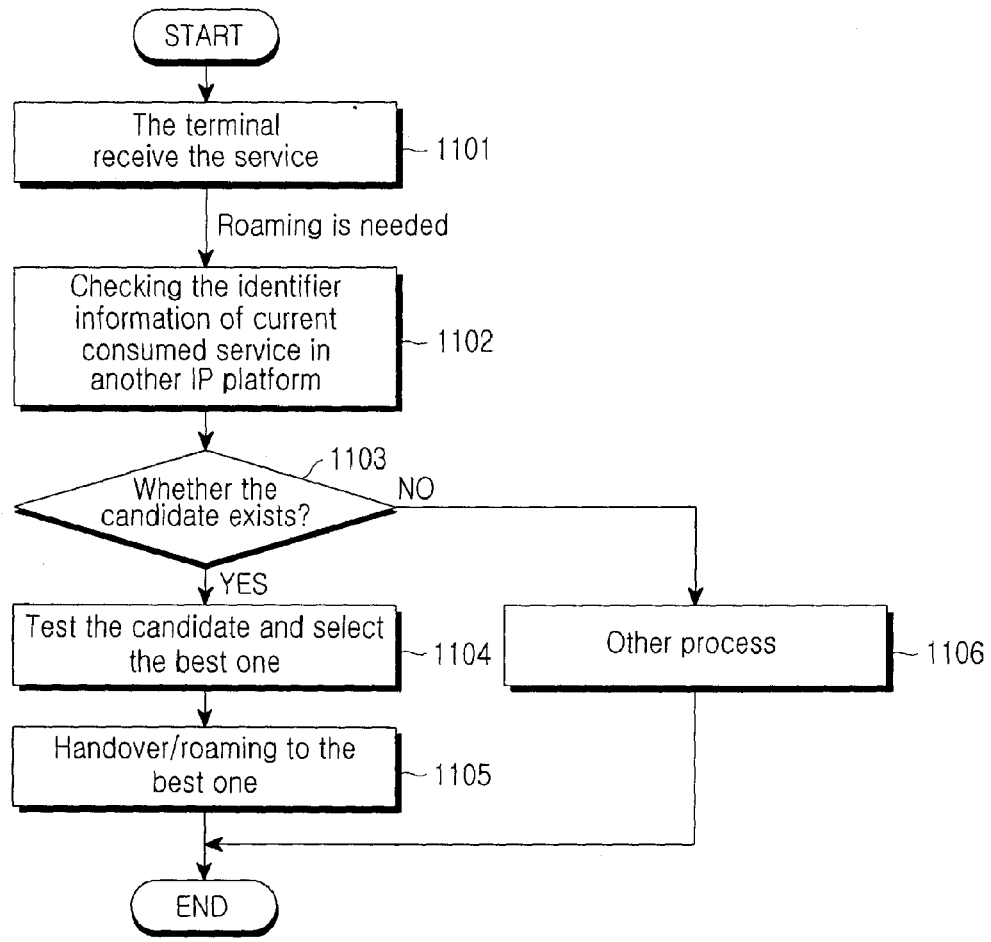
FIG. 11 is a flow diagram illustrating an operation of a terminal according to the present invention.

FIG. 11 is a flow diagram illustrating an operation of a terminal according to the second embodiment of the present invention.

Referring to FIG. 11, the terminal receives a service in step 1101. Then, in step 1102, when roaming is necessary, the terminal checks ID information of a service, which corresponds to a currently received service and is transmitted in another IP platform.

Then, in step 1103, it is determined if a candidate service exists. When candidate services exist, the terminal proceeds to step 1104 in which the terminal tests the candidate services and select one service from among the candidate services. In step 1105, the terminal performs roaming in order to receive the selected service.

As a result of the determination in step 1103, when no candidate service exists, the terminal proceeds to step 1106 in which the terminal performs another process.

Figure 12:
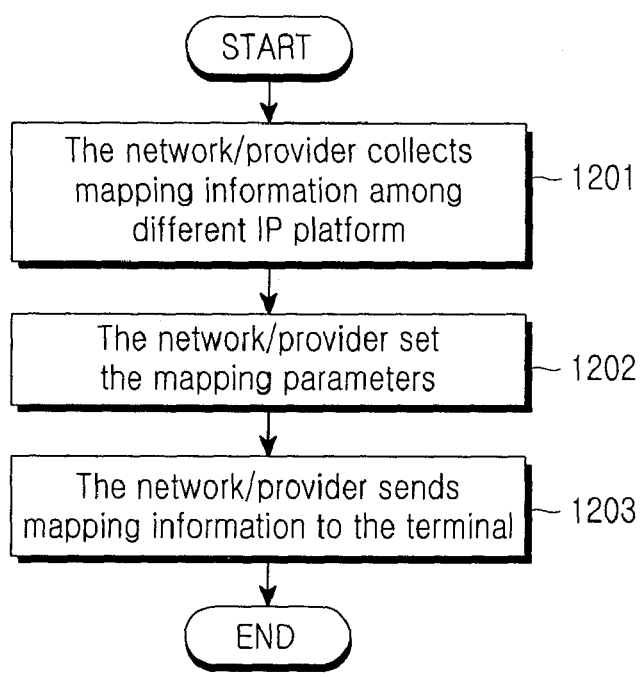
FIG. 12 is a flow diagram illustrating an operation of a network according to the present invention.

FIG. 12 is a flow diagram illustrating an operation of a network according to the second embodiment of the present invention.

Referring to FIG. 12, the network selects service mapping information about different IP platforms in step 1201, sets a mapping parameter about the selected mapping information in step 1202, and transmits the mapping information including the set mapping parameter to the terminal in step 1203.

Figure 13:
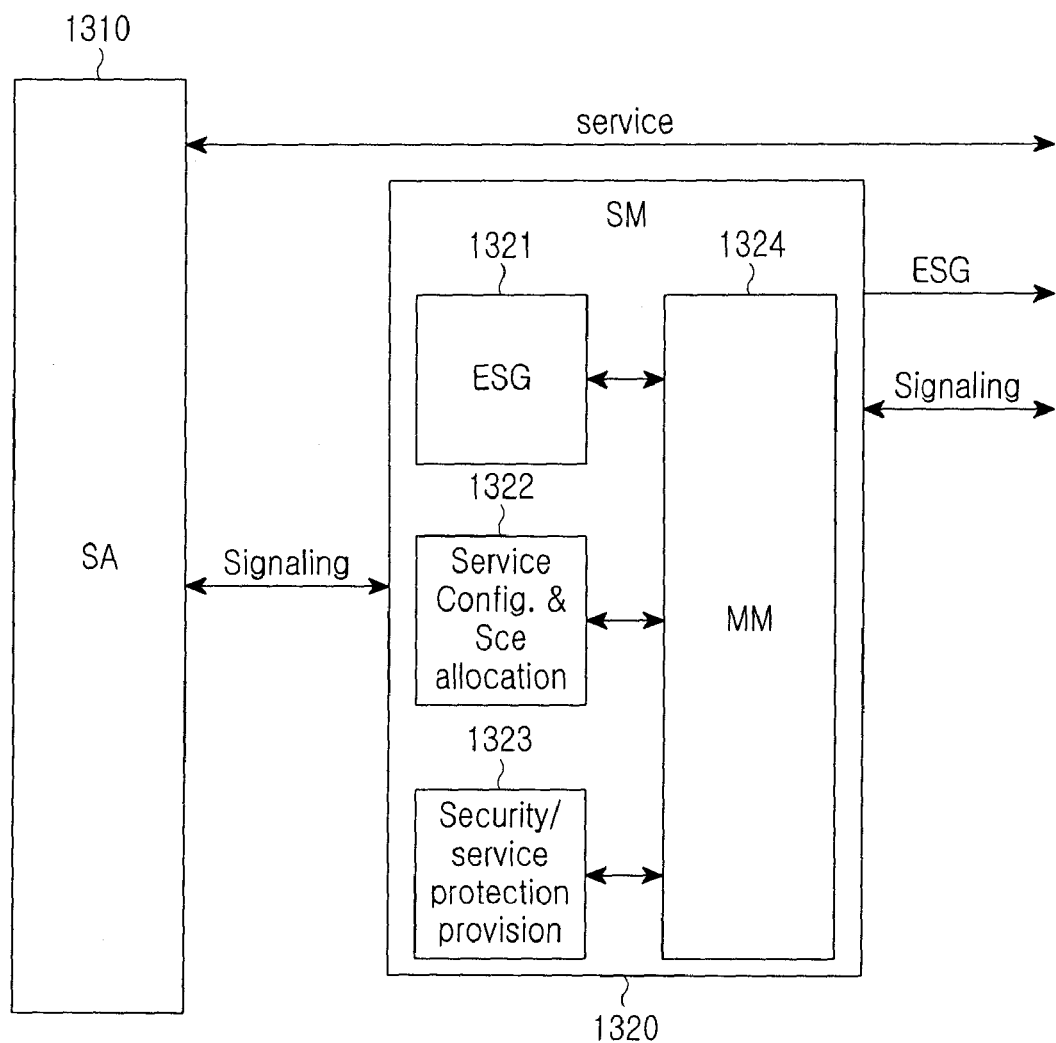
FIG. 13 is a block diagram of a network according to the present invention.

FIG. 13 is a block diagram of a network according to the present invention.

Referring to FIG. 13, a service application unit 1310 collects contents from multiple sources and related metadata in order to provide specific service applications, provides head-end application logic, provides contents encoded in a format which the terminal understands through streaming or file carousel transfer, and generates metadata to be used in ESG The service application unit 1310 may exist for each application provided to the IP datacast.

A service management unit 1320 includes lower entities, including an ESG provider 1321, a service configuration/resource allocation unit 1322, a security/service protection provider 1323, and a mobility manager 1324. The mobility manager 1324 can support the roaming process through communication with the other three entities 1321 to 1323. Further, the mobility manager 1324 transmits/receives roaming proposals and responses, communicates with other entities and lower entities so as to support the roaming process, and communicates with a mobility manager of another network in order to exchange information. The service configuration/resource allocation unit 1322 registers service applications competing with each other in order to obtain a bandwidth of a broadcasting bearer, allocates services to a bandwidth and point related to the shape of the broadcast network, and schedules the services over time. The ESG provider 1321 collects ESG (metadata information) fragments from the service applications 1310. The security/service protection provider 1323 manages user access to the service applications 1310.

Figure 14:
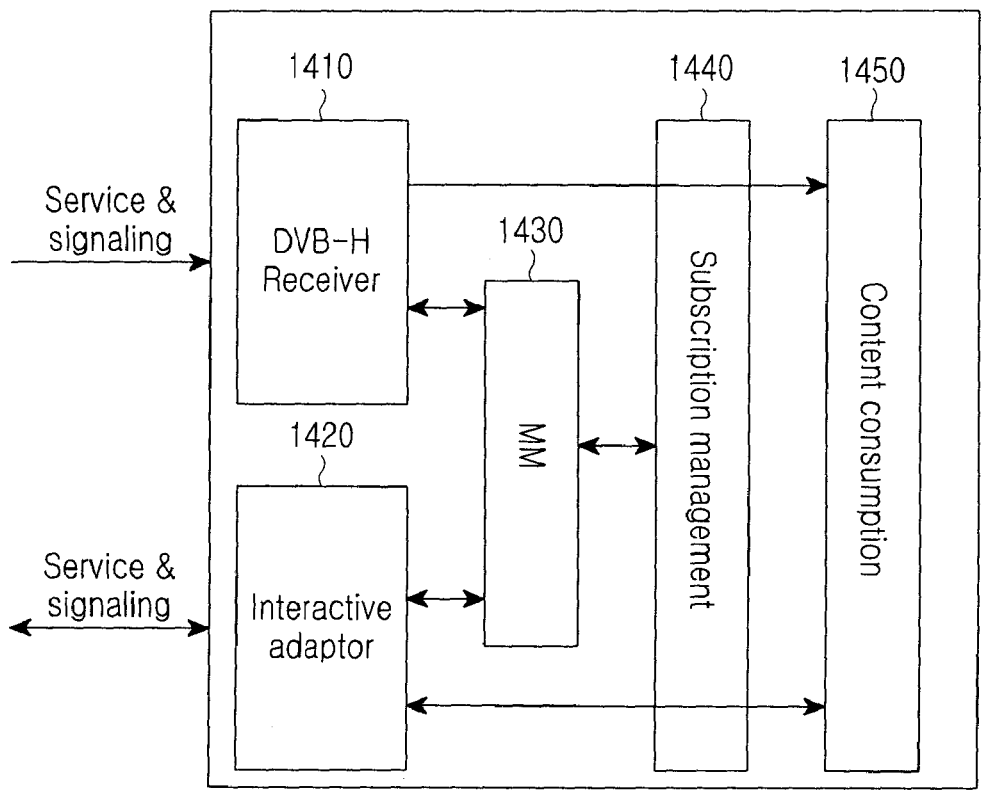
FIG. 14 is a block diagram of a terminal according to the present invention.

FIG. 14 is a block diagram of a terminal according to the present invention.

Referring to FIG. 14, a DVB-H receiver 1410 receives and restores a DVB-H broadcasting signal. An interactive adaptor 1420 provides a service using a mobile communication network. A mobility manager 1430 manages a reception environment according to movement of the terminal. A subscription manager 1440 manages obtainment of an authority, continuously traces the authority obtained by the terminal, and manages decoding of the service contents. A content consumption unit 1450 sends the received broadcast service to the user.

The service mapping information according to the present invention as described above may be transmitted either through a broadcast network while being carried by the PSI/SI, or through an interactive network while being carried by a notification message, a particular signal, or a request message from the terminal.

The present invention as described above has the following effects.

In a DVB-H CBMS system according to the present invention, the system transmits service mapping information according to transport streams or IP platforms to the terminal, so that the system can provide a service without interruption to the terminal even when a user of the terminal moves out of a current cell or network into a new cell or network while receiving a service that the user selected.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A terminal for receiving a broadcast service in a mobile Digital Video Broadcasting-Handheld (DVB-H) Convergence of Broadcasting and Mobile Service (CBMS) system, the terminal comprising:
    a broadcast receiver for receiving, from a broadcast network, a specific broadcast service that is commonly provided through a plurality of Internet Protocol (IP) platforms existing in a single transport stream, the specific broadcast service comprising Program Specific Information/Service Information (PSI/SI) for the specific broadcast service including mapping information between the plurality of IP platforms that identifies different service IDentifiers (IDs) allocated to the specific broadcast service provided through the respective IP platforms;
    and
    a mobility manager for managing movement to another network by checking the mapping information to identify at least one of the IP platforms providing the specific broadcast service identified by at least one of the different service IDs.

2. The terminal as claimed in claim 1, wherein the mapping information between the plurality of IP platforms includes service ID information for each of the plurality of IP platforms.

3. The terminal as claimed in claim 2, wherein the mapping information between the plurality of IP platforms further includes service type information, the service type information comprising information for identifying a service, variation information about the specific broadcast service, and information indicating an associated service.

4. The terminal as claimed in claim 3, wherein the mapping information between the plurality of IP platforms further includes an ID of an IP platform providing the specific broadcast service.

5. The terminal as claimed in claim 4, wherein the mapping information between the plurality of IP platforms further includes information related to network, cell, and frequency.

6. The terminal as claimed in claim 1, wherein if the specific broadcast service is provided from the broadcast network through a plurality of transport streams, the mapping information between the plurality of transport streams is received through the PSI/SI to check different service IDs allocated to the specific broadcast service provided through the respective transport streams.

7. The terminal as claimed in claim 6, wherein the mapping information between the plurality of transport streams includes a service ID for each of the plurality of transport streams, a transport stream ID, and an original network ID.

8. The terminal as claimed in claim 7, wherein the mapping information between the plurality of transport streams further includes service type information, the service type information including information for identifying a service, variation information about the specific broadcast service, and information indicating an associated service.

9. The terminal as claimed in claim 8, wherein the mapping information between the plurality of transport streams further includes information indicating that the specific broadcast service is provided through different transport streams.

10. The terminal as claimed in claim 9, wherein the mapping information between the plurality of transport streams further includes information related to network, cell, and frequency.

11. A method for receiving a broadcast service by a terminal in a mobile Digital Video Broadcasting-Handheld (DVB-H) Convergence of Broadcasting and Mobile Service (CBMS) system, the method comprising the steps of:
    receiving, from a broadcast network, a specific broadcast service that is commonly provided through a plurality of Internet Protocol (IP) platforms existing in a single transport stream, the specific broadcast service including Program Specific Information/Service Information (PSI/SI) for the specific broadcast service including mapping information between the plurality of IP platforms that identifies different service IDentifiers (IDs) allocated to the specific broadcast service provided through the respective IP platforms;
    and
    managing movement to another broadcast network by checking the mapping information to identify at least one of the IP platforms providing the specific broadcast service identified by at least one of the different service IDs.

12. The method as claimed in claim 11, wherein the mapping information between the plurality of IP platforms includes service ID information for each of the plurality of IP platforms.

13. The method as claimed in claim 12, wherein the mapping information between the plurality of IP platforms further includes service type information, the service type information comprising information for identifying a service, variation information about the specific broadcast service, and information indicating an associated service.

14. The method as claimed in claim 13, wherein the mapping information between the plurality of IP platforms further includes an ID of an IP platform providing the specific broadcast service.

15. The method as claimed in claim 14, wherein the mapping information between the plurality of IP platforms further includes information related to network, cell, and frequency.

16. The method as claimed in claim 11, wherein managing of the movement comprises, if the specific broadcast service is provided from the broadcast network through a plurality of transport streams, receiving mapping information between the plurality of transport streams through the PSI/SI to check different service IDs allocated to the specific broadcast service provided through the respective transport streams, and controlling reception of the specific broadcast service through other transport streams by using the mapping information between the plurality of transport streams.

17. The method as claimed in claim 16, wherein the mapping information between the plurality of transport streams further includes information related to network, cell, and frequency.

18. The method as claimed in claim 17, wherein the mapping information between the plurality of transport streams further includes service type information, the service type information comprising information for identifying a service, variation information about the specific broadcast service, and information indicating an associated service.

19. The method as claimed in claim 18, wherein the mapping information between the plurality of transport streams further includes information indicating that the specific broadcast service is provided through different transport streams.

20. The method as claimed in claim 19, wherein the mapping information between the plurality of transport streams includes a service ID for each of the plurality of transport streams, a transport stream ID, and an original network ID.

* * * * *